United States Patent [19]

Snider et al.

[11] Patent Number: 4,711,912
[45] Date of Patent: Dec. 8, 1987

[54] POLYISOCYANURATE FOAMS FROM DIGESTION PRODUCTS OF POLYALKYLENE TEREPHTHALATE POLYMERS AND POLYOLS

[75] Inventors: Scott C. Snider, Pinellas Park; Alberto DeLeon, Clearwater, both of Fla.

[73] Assignee: The Celotex Corporation, Tampa, Fla.

[21] Appl. No.: 372,904

[22] Filed: Apr. 29, 1982

[51] Int. Cl.[4] .................. C08G 18/00; C08G 18/14
[52] U.S. Cl. ................................ 521/125; 521/129; 521/160; 521/173; 521/902
[58] Field of Search ............... 521/125, 129, 160, 173, 521/902

[56] References Cited

U.S. PATENT DOCUMENTS

| 3,940,517 | 2/1976 | DeLeon | 521/118 |
|---|---|---|---|
| 4,038,257 | 7/1977 | Suzuki et al. | 260/75 NK |
| 4,048,104 | 9/1977 | Svoboda et al. | 260/2.5 AN |
| 4,118,533 | 10/1978 | Hipchen et al. | 428/297 |
| 4,137,221 | 1/1979 | Hara et al. | 528/273 |
| 4,169,921 | 10/1979 | Moss et al. | 521/125 |
| 4,220,563 | 9/1980 | Hara et al. | 260/2.3 |
| 4,223,068 | 9/1980 | Carlstrom et al. | 428/310 |
| 4,237,238 | 12/1980 | DeGuiseppi et al. | 521/131 |
| 4,246,365 | 1/1981 | Wiedermann et al. | 521/172 |
| 4,251,649 | 2/1981 | Hara et al. | 525/439 |
| 4,284,683 | 8/1981 | Hipchen et al. | 428/285 |
| 4,316,935 | 2/1982 | Moss | 428/304.4 |
| 4,417,001 | 11/1983 | Svoboda et al. | 521/114 |

FOREIGN PATENT DOCUMENTS 1497956 1/1978 United Kingdom .

Primary Examiner—John Kight, III
Assistant Examiner—M. L. Moore
Attorney, Agent, or Firm—James W. Grace; Charles W. Vanecek

[57] ABSTRACT

Polyisocyanurate foams are prepared by reacting together an organic polyisocyanate, a blowing agent, a trimerization catalyst, and a minor amount of a polyol mixture prepared by digesting polyalkylene terephthalate, particularly polyethylene terephthalate, with a polyol, especially a glycol. Laminates of such foams exhibit a high degree of fire resistance, low smoke evolution on combustion, low foam friability and high compressive strength.

35 Claims, 4 Drawing Figures

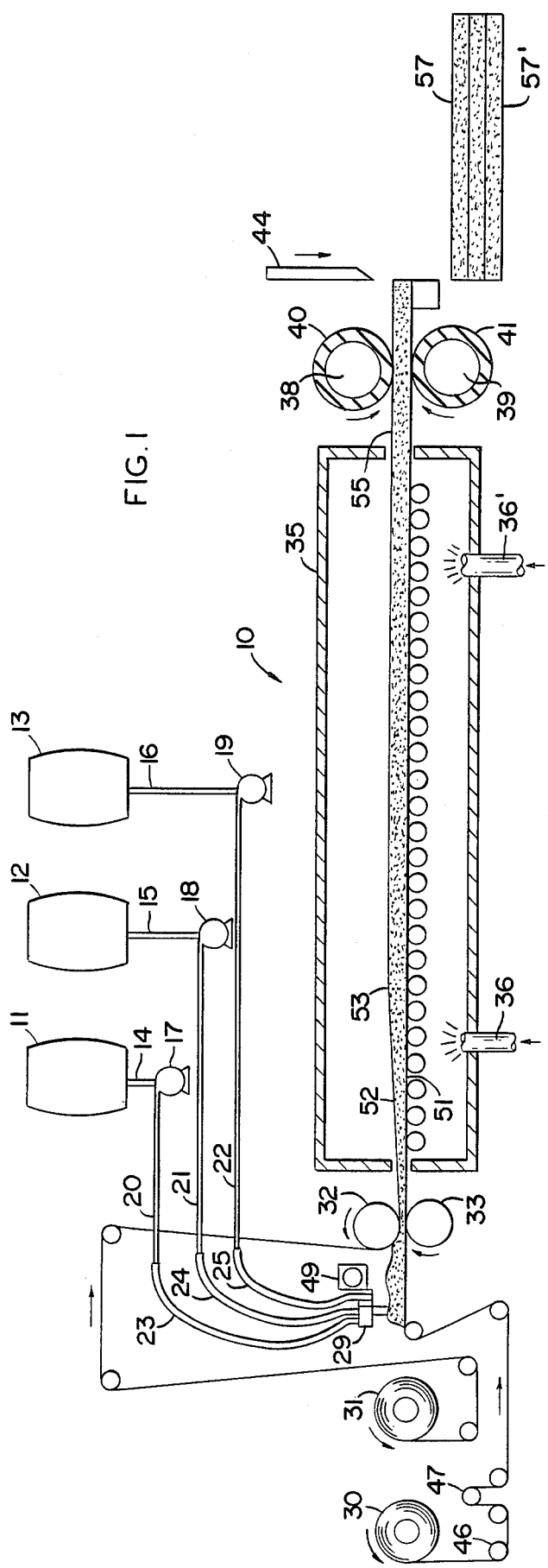
FIG. 1
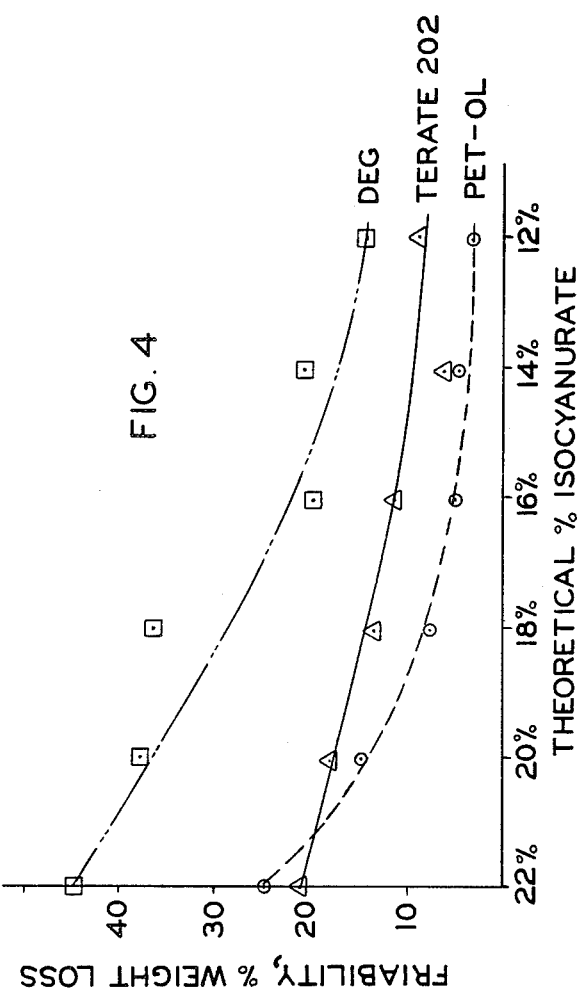
FIG. 4
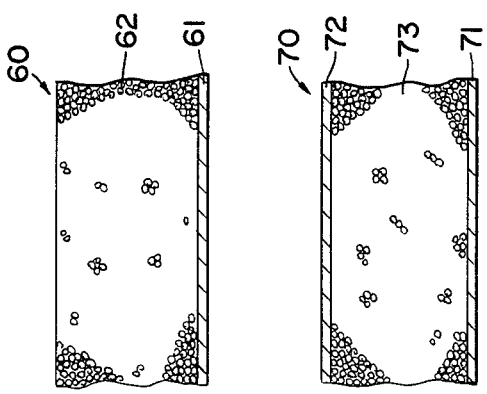
FIG. 2
FIG. 3

POLYISOCYANURATE FOAMS FROM DIGESTION PRODUCTS OF POLYALKYLENE TEREPHTHALATE POLYMERS AND POLYOLS

BACKGROUND OF THE INVENTION

1. Field of the Invention

This invention relates to the preparation of cellular polyisocyanurate foam materials. The foams can be produced from organic polyisocyanates and polyols which are the hydroxyl-terminated digestion products of (a) polyalkylene terephthalate polymers and (b) organic polyols.

2. Description of the Prior Art

The preparation of foams characterized by isocyanurate and urethane linkages is well known in the art. Generally, these foams are prepared by reacting an organic polyisocyanate with a polyol in the presence of a blowing agent and a catalyst(s). Polyester polyols of many types can be used as the polyol components in the production of these foams.

U.S. Pat. No. 4,039,487, for example, discloses the use of aromatic polyester polyols to prepare polyisocyanurate foams. Although the foams of this patent have good fire resistance and low smoke evolution upon combustion, they have a relatively high friability. Furthermore, the polyols are comparatively expensive to manufacture.

U.S. Pat. No. 4,092,276 also discloses the use of rather costly aromatic polyester polyols in preparing polyisocyanurate foams. Another disadvantage of these foams is that they do not have especially high compressive strength. A further problem with using aromatic polyester polyols, particularly those of low molecular weight, is that the polyols tend to be solid at room temperature, or to be characterized by very high viscosity and poor solubility in resin mixtures, thus making them difficult to handle.

To remedy the above drawbacks, it has been proposed in U.S. Pat. No. 4,237,238 to use in the preparation of polyisocyanurate foams a minor amount of a cheap by-product type of liquid polyol mixture which is obtained by the transesterification, with a glycol of molecular weight from about 60 to 400, of a dimethyl terephthalate esterified oxidate reaction product residue. The polyisocyanurate foams produced are disclosed to be characterized by a high degree of fire resistance with low smoke evolution on combustion, a low foam friability and reasonably good compressive strength.

Another source of aromatic polyester polyols is available through the recovery of polyester wastes. High molecular weight polyesters of terephthalic acid and aliphatic dihydric alcohols are well known in the art. These high molecular weight polyesters, especially polyethylene terephthalate (PET), are used commercially for the manufacture of packaging film, fibers, electrical insulators, molded articles, such as PET beverage bottles, etc. The various manufacturing processes unfortunately generate considerable waste as the polyester is processed into commercial form. Also, the tremendous quantities of spent consumer goods containing the polyester constitute a huge supply of scrap polyester material.

There is a growing awareness of the need for energy conservation and the utilization of recyclable materials. It is realized that the judicious use of plastics can contribute significantly to energy savings. The industry has long recognized that recycling waste polyalkylene terephthalate would conserve raw materials, improve process economics, and eliminate the problem of waste disposal. Numerous processes have been proposed for recovering useful products from waste or scrap polyalkylene terephthalate by reducing or digesting the high molecular weight polymer to short-chain fragments. These short-chain fragments have been used principally in the production of additional polyester materials.

The use of a polyalkylene terephthalate digestion product in flexible polyurethane foam is described in U.S. Pat. No. 4,048,104. In this patent, the digestion product is employed to prepare polyisocyanate prepolymers, and not as a polyol ingredient in the manufacture of flexible polyurethane foam. U.S. Pat. No. 4,223,068 discloses the manufacture of rigid polyurethane foam wherein 5 to 30 percent of the weight of the organic polyol used in the manufacture is a digestion product of polyalkylene terephthalate residues or scraps digested with organic polyols.

OBJECTS OF THE INVENTION

It is an object of the present invention to provide improved polyisocyanurate foams having a combination of advantageous properties, including a reduced friability and high thermal stability and compressive strength, and a method of producing the foams.

It is another object of the present invention to produce polyisocyanurate foam materials characterized by a high degree of fire resistance with low smoke evolution and flame spread on combustion, and the formation of a protective intumescent char over unburnt foam upon combustion.

It is still another object of the present invention to provide polyisocyanurate foams which are characterized by a high conversion to trimer.

It is a further object of the present invention to provide closed cell polyisocyanurate foam materials which can be used in building panels which are highly insulating, thermally resistant, low in friability, soundproof and self-supporting.

These and other objects and advantages of the present invention will become more apparent by reference to the following detailed description and drawings wherein:

FIG. 1 is a side schematic representation of an apparatus suitable for producing a cellular foam material in accordance with the present invention;

FIG. 2 is a cross-sectional view of a laminated building panel having one facing sheet;

FIG. 3 is a cross-sectional view of a laminated building panel having two facing sheets; and FIG. 4 is a graph showing the variation of friability with % trimer for polyisocyanurate foams of the invention and two comparative polyisocyanurate foams.

DESCRIPTION OF THE INVENTION

The above objects have been achieved and the drawbacks of the prior art have been overcome by the development of an improved polyisocyanurate foam which is prepared by reacting an organic polyisocyanate with a polyalkylene terephthalate digestion product in the presence of a blowing agent and a catalyst(s). The polyalkylene terephthalate digestion product comprises a polyol mixture prepared by digesting polyalkylene terephthalate polymers with low molecular weight polyols.

The polyalkylene terephthalate (principally polyethylene terephthalate) polymers to be digested are available in the form of films, fibers, and shaped articles. In addition, polyalkylene terephthalate polymers are available as sludges which are obtained as cleanup by-products from polyalkylene terephthalate manufacturing plants. The waste or scrap polyalkylene terephthalate contains recurring units of the formula

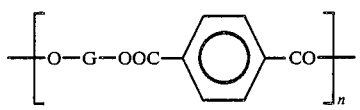

wherein G represents a divalent organic radical containing from 2 to 10 carbon atoms attached to the adjacent oxygen atoms by saturated carbon atoms. In polyethylene terephthalate G is $-C_2H_4-$. The molecular weight of such polyalkylene terephthalate polymers is at least about 15,000 and ranges upward to 100,000 or more. Lower molecular weight oligomers of the polyalkylene terephthalates also can be used.

According to the present invention the polyalkylene terephthalate polymers are digested or degraded with low molecular weight polyols which can be aliphatic, cycloaliphatic or aromatic, and are preferably selected from the group consisting of diols and triols. More preferably, the polyol is an aliphatic dihydric alcohol which desirably has from 2 to 16 carbon atoms. The molecular weight of the digesting polyol advantageously ranges from about 60 to about 500. Examples of suitable diols include alkylene glycols and glycol ethers, such as ethylene, oxydiethylene, propylene, oxydipropylene, butylene, pentylene, hexylene, and octamethylene glycols, and isomeric forms thereof, and the polyoxyalkylene glycols such as polyoxyethylene and polyoxypropylene glycols, 1,4-bis-hydroxymethyl cyclohexane, dimethylol dicyclopentadiene, 1,3-cyclohexanediol, 1,4-cyclohexanediol, hydroxy-terminated polyesters, bis(2-hydroxyethoxyethyl) glutarate, and in general hydroxy-terminated ethers, esters or mixed ether esters having a molecular weight of about 500 or less. The digesting polyols may, of course, be used as mixtures of two or more polyols. The polyols may include substituents which are inert in the digestion reaction, for example, chlorine and bromine substituents.

Two preferred polyols are polyoxyethylene glycols and diethylene glycol, with the latter being more preferred.

The digestion or depolymerization reaction is conveniently effected by admixing the polyalkylene terephthalate polymer with the digesting polyol, which is preferably in excess of the quantity needed to react with the polymer on the basis of stoichiometry, and carrying out the reaction under normal depolymerization conditions well known and described in the prior art. Use of a greater excess of polyol in the digestion, such as an excess of polyol of about 20 to 30 percent by weight, is found to reduce a tendency of the digested polyol mixture of the invention to increase in viscosity with time after being prepared with smaller excesses of polyol. Illustratively, the digestion or depolymerization can be conducted in the absence of a liquid reaction medium composed of material other than the digesting polyol under a flow of nitrogen and at atmospheric pressure and temperatures from about 150° C. to about 250° C. for a period from about one hour to about ten hours.

The digestion reaction is normally catalyzed. Generally, enough depolymerization or transesterification catalyst is added to the reaction mixture to suitably promote the reaction. Any conventional transesterification catalyst (single compound or mixture of compounds) can be used.

The digestion process is considered to be substantially complete when a solution of the sample being digested is formed. However, some polyalkylene terephthalate materials contain dispersed solids which can be catalyst particles (left over from the processing by which the terephthalate was produced); or may be pigments or other foreign substances. Such dispersed solids may remain in the digestion product, so long as they are substantially inert in the subsequent preparation of rigid polyisocyanurate foam.

Although the digested polyol mixture of the invention generally can be employed without being filtered, it is also possible to filter this mixture prior to its subsequent utilization in foam preparations.

The properties of the digested polyol mixtures of the present invention fall within rather broad ranges because of the variable nature of the polyalkylene terephthalate materials themselves. Accordingly, the viscosities (Brookfield) of the digested polyol mixtures measured in cps. at 25° C. fall within a rather broad range from about 500 to about 50,000, preferably about 500 to about 20,000, and most preferably about 700 to about 8,000; the hydroxyl number values fall within a range of from about 700 to about 120, preferably about 280 to about 600, and most preferably from about 400 to about 550; the acid number falls within a range of from about 0.2 to about 20 and preferably about 0.2 to about 10.

The polyol is preferably employed in excess in the digestion reaction so that at the end of the reaction there is an excess of digesting polyol remaining in the polyol mixture of the invention. This excess can vary broadly but advantageously falls within a range of from about 5 to about 40, preferably about 10 to about 30, percent by weight of the polyol mixture.

A most preferred digested polyol mixture of the invention is characterized by a viscosity in cps. at 25° C. of about 700 to about 8,000, a free diethylene glycol content of from about 10 to about 30 percent by weight of said mixture, a hydroxyl number within a range of from about 400 to about 550, and an acid number of about 0.2 to about 10.

Although the digested polyol mixtures of this invention can be readily produced as fluid materials, particularly by employing excess polyol digesting agent and leaving residual polyol in the mixtures, additional diluents can be employed with the polyol mixtures. Inert diluents can be employed, but it is usually preferred to employ liquid polyols. Therefore, in a preferred embodiment of the present invention, diols such as ethylene glycol, diethylene glycol, dipropylene glycol, or any of the other glycols set forth above as digesting agents may be added in a later step to reduce the viscosity of the digested polyol mixture.

For purposes of viscosity reduction, these diluents are generally employed in only minor amounts, as, e.g., in the range of about 1 to 40 percent, preferably about 5 to 30 percent, by weight of the digested polyol mixture. However, it is also within the scope of the present invention to form polyol mixtures wherein the digesting polyol is present in greater amounts. The content of digesting polyol in the mixture can be progressively increased to the point where it is the major component and the digested polyol mixture of the invention is present in only minor amount, as, e.g., in the range of about 1 to 20 percent by weight of the digesting polyol.

The polyol mixtures of the present invention may be used in the preparation of both cellular and non-cellular polyisocyanurate polymers. The latter polymers can be prepared by using standard techniques known to those skilled in the art. The polyol mixtures are particularly useful in the preparation of polyisocyanurate foams. These foams can be prepared by mixing together the organic polyisocyanate with the polyol mixture, catalyst and blowing agent at temperatures ranging from about 0° C. to 150° C.

In the broadest aspects of the present invention, any organic polyisocyanate can be employed in the preparation of the foams of the present invention. The organic polyisocyanates which can be used include aromatic, aliphatic and cycloaliphatic polyisocyanates and combinations thereof. Representative of these types are the diisocyanates such as m-phenylene diisocyanate, toluene-2,4-diisocyanate, toluene-2,6-diisocyanate, mixtures of 2,4- and 2,6-toluene diisocyanate, hexamethylene-1,6-diisocyanate, tetramethylene-1, 4-diisocyanate, cyclohexane-1,4-diisocyanate, hexahydrotoluene 2,4- and 2,6-diisocyanate, naphthalene-1, 5-diisocyanate, diphenylmethane-4,4'-diisocyanate, 4,4'-diphenylenediisocyanate, 3,3'-dimethoxy-4,4'-biphenyldiisocyanate, 3,3'-dimethyl-4,4'-biphenyldiisocyanate, and 3,3'-dimethyldiphenylmethane-4,4'-diisocyanate; the triisocyanates such as 4,4',4"-triphenylmethanetriisocyanate, polymethylenepolyphenyl isocyanate, toluene-2,4,6-triisocyanate; and the tetraisocyanates such as 4,4'-dimethyldiphenylmethane-2,2',5,5'-tetraisocyanate. These isocyanates are prepared by conventional methods known in the art such as the phosgenation of the corresponding organic amine.

In a preferred rigid foam of the invention, the organic polyisocyanate is polymethylene polyphenylisocyanate. The polymethylene polyphenylisocyanates desirably have a functionality of at least 2.1 and preferably 2.5 to 3.2. These preferred polymethylene polyphenylisocyanates generally have an equivalent weight between 120 and 180 and preferably have an equivalent weight between 130 and 145. The friability of foams made with these polyisocyanates is desirably less than 30%, preferably less than 20%.

A preferred subclass of polymethylene polyphenylisocyanates especially useful in the present invention is a mixture of those of the following formula:

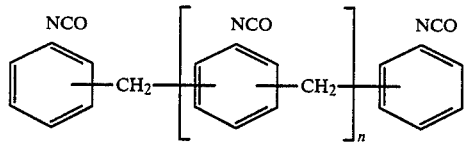

wherein n is an integer from 0 to 8 and wherein the mixture has the above-described functionality and equivalent weight. This mixture should have a viscosity between 100 and 4,000 and preferably 250 to 2500 centipoises measured at 25° C. in order to be practical for use in the present invention.

Examples of suitable polymethylene polyphenylisocyanates useful in the present invention include those of the above formula, wherein n is 1 as well as mixtures wherein n can have any value from 0 to 8 as long as the mixture has the specified equivalent weight. One such mixture has 40 weight percent of n=0, 22 weight percent of n=1, 12 weight percent of n=2, and 26 weight percent of n=3 to about 8. The preferred polymethylene polyphenyl isocyanates are described in U.S. application Ser. No. 322,843, filed Jan. 11, 1973, now abandoned. The synthesis of polymethylene polyphenylisocyanates is described in Seeger et al., U.S. Pat. No. 2,683,730 and in Powers U.S. Pat. No. 3,526,652 at column 3, lines 6–21. It should, therefore, be understood that the polymethylene polyphenylisocyanates available on the market under the tradenames of CODE 047 or PAPI-20 (Upjohn) and MR 200 (Mobay) can successfully be employed within the spirit and scope of the present invention.

In order to ensure complete reaction, the polymethylene polyphenylisocyanate and the polyol mixture are generally mixed in an equivalent ratio of 1.5:1 to 6:1 and preferably 2:1 to 5:1. In ranges outside these proportions the reaction yields a product having undesirable physical characteristics. At higher ratios the product has an undesirably high friability. At lower ratios the product has an undesirably high flammability.

In the preparation of these polyisocyanurate rigid foams, any catalysts known to catalyze the trimerization of isocyanates to form isocyanurates, and to catalyze the reaction of isocyanate groups with hydroxyl groups to form polyurethanes, can be employed. The preferred catalysts give cream times of 15 to 30 seconds and firm times of 25 to 80 seconds. One preferred type of catalyst is a mixture of a tertiary amino phenol, such as 2,4,6-tris(dimethylaminomethyl)phenol, and an alkali metal carboxylate, such as potassium-2-ethyl hexoate, the synthesis and use of which are described in U.S. Pat. No. 4,169,921. The disclosure of this patent is hereby incorporated by reference. The equivalent ratio of tertiary amino phenol to alkali metal carboxylate in the cocatalyst composition is desirably about 0.4:1 to 2.5:1. Another catalyst system is that employing an epoxide, an N-substituted aziridine, and a tertiary amine. The synthesis and use of such a catalyst are described in U.S. application Ser. No. 251,279, filed May 8, 1972, now U.S. Pat. No. 3,799,896. The catalysts generally comprise from 0.1 to 20 and preferably from 0.3 to 10 weight percent of the total composition.

Any blowing agent typically employed in similar prior art foam products containing polyisocyanurate linkages can be employed in the foam compositions of the present invention. In general, these blowing agents are liquids having a boiling point between minus 50° C. and plus 100° C. and preferably between 0° C. and 50° C. The preferred liquids are hydrocarbons or halohydrocarbons. Examples of suitable blowing agents include, among others, chlorinated and fluorinated hydrocarbons such as trichlorofluoromethane, $CCl_2FCClF_2$, $CCl_2FCF_3$, diethylether, isopropyl ether, n-pentane, cyclopentane, and 2-methylbutane. Combinations of trichlorofluoromethane plus 1,1,2-trichloro-1,2,2-trifluoroethane, are the preferred blowing agents. The blowing agents are employed in an amount sufficient to give the resultant foam the desired bulk density which is generally between 0.5 and 10, and preferably between 1 and 5 pounds per cubic foot. The blowing agent generally comprises from 1 to 30, and preferably comprises from 5 to 20 weight percent of the composition. When the blowing agent has a boiling point at or below ambient, it is maintained under pressure until mixed with the other components. Alternatively, it can be maintained at subambient temperatures until mixed with the other components.

Any suitable surfactant can be employed in the foams of this invention. Successful results have been obtained with silicone/ethylene oxide/propylene oxide copolymers as surfactants. Examples of surfactants useful in the present invention include, among others, polydimethylsiloxane-polyoxyalkylene block copolymers available from the Union Carbide Corporation under the trade names "L-5420" and "L-5340" and from the Dow Corning Corporation under the trade name "DC-193". Other suitable surfactants are those described in U.S. application Ser. No. 282,322, filed July 10, 1981 now U.S. Pat. No. 4,365,024. Included among the latter surfactants is the product supplied by Jim Walter Resources, Inc. under the trade designation "CGS-100." Generally, the surfactant comprises from about 0.05 to 10, and preferably from 0.1 to 6, weight percent of the foam-forming composition.

Other additives may also be included in the foam formulations. Included are flame retardants, such as tris(2-chloroethyl)-phosphate, dispersing agents, plasticizers, fillers and pigments.

Referring now to the drawings, and in particular to FIG. 1, there is shown schematically an apparatus 10 suitable for use in connection with the present invention. The apparatus 10 comprises an isocyanate tank 11, a polyol tank 12, and a catalyst tank 13, each respectively connected to outlet lines 14, 15, and 16. The lines 14, 15, and 16 form the inlet to metering pumps 17, 18, and 19. The pumps 17, 18, and 19 discharge respectively through lines 20, 21, and 22 which are in turn respectively connected to flexible lines 23, 24, and 25. The flexible lines 23, 24, and 25 discharge to mixing head 29. The apparatus 10 is also provided with a roll 30 of lower substrate material and a roll 31 of upper substrate material. The apparatus 10 is also provided with metering rolls 32 and 33, and an oven 35 provided with vents 36, 36' for blowing hot air. The apparatus 10 is also provided with pull rolls 38, 39 and cutting knife 44.

In operation, the isocyanate tank 11 is charged with the organic polyisocyanate admixed with the blowing agent and the surfactant, and the polyol tank 12 is charged with the polyol mixture of the invention, and the catalyst tank 13 is charged with the catalyst composition. The speeds of the pumps 17, 18, and 19 are adjusted to give the desired ratios of the ingredients in the tanks 11, 12, and 13. These ingredients pass respectively through lines 20, 21, and 22 as well as lines 23, 24, and 25, whereupon they are mixed in the mixing head 29 and discharged therefrom. Alternatively, lines 21 and 22 can be combined prior to the mixing head. The pull rolls 38, 39, each of which has a flexible outer sheath 40, 41 are caused to rotate in the direction of the arrows by a power source (not shown). By virtue of rotation of the pull rolls 38, 39 lower substrate material is pulled from the roll 30, whereas upper substrate material is pulled from the roll 31. The substrate material passes over idler rollers such as idler rollers 46 and 47 and is directed to the nip between metering rolls 32, 33. The mixing head 29 is caused to move back and forth, i.e. out of the plane of the paper by virtue of its mounting on reversible mechanism 49. In this manner, an even amount of material can be maintained upstream of the nip between the metering rolls 32, 33. The composite structure at this point now comprising a lower substrate 51, an upper substrate 52 on either side of a core 53, now passes into the oven 35. While in the oven 35 the core expands under the influence of heat added by the hot air from vents 36, 36' and due to the heat generated in the exothermic reaction between the polyol mixture and the isocyanate in the presence of the catalyst. The temperature within the oven is controlled by varying the temperature of the hot air from vents 36, 36', in order to insure that the temperature within the oven 35 is maintained within the herein described limits. The composite structure 55 then leaves the oven 35, passes between the nip of the pull rolls 38, 39 and is cut by knife 44 into individual panels 57, 57'.

Numerous modifications to the apparatus 10 will be immediately apparent to those skilled in the art. For example, the tanks 11, 12, and 13 can be provided with refrigeration means in order to maintain the reactants at subambient temperatures.

Referring to FIG. 2 of the drawings, there is shown a laminated building panel 60 of the invention. The building panel 60 comprises a single facing sheet 61 having thereon a cellular material 62 of the present invention. FIG. 3 shows a building panel 70 having two facing sheets 71 and 72 on either side of a cellular material 73.

Any facing sheet previously employed to produce building panels can be employed in the present invention. Examples of suitable facing sheets include, among others, those of kraft paper, aluminum, and asphalt impregnated felts, as well as laminates of two or more of the above.

The foam materials of the invention can also be used, with or without a facer(s), for pipe insulation.

The foam materials of the invention can contain various reinforcement materials, such as a quantity of glass fibers, as described in U.S. Pat. Nos. 4,118,533 and 4,284,683, the disclosures of which are hereby incorporated by reference.

The invention is further illustrated by the following examples in which all parts and percentages are by weight unless otherwise indicated.

EXAMPLE 1

Preparation of Polyols from Polyethylene Terephthalate

This example illustrates the preparation of various digested polyol mixtures of the present invention.

To a 5,000 ml resin kettle fitted with a mechanical stirrer, a thermometer, a reflux condenser, an inlet and outlet for nitrogen, and a heating mantel were added 2132.2 g of scrap polyethylene terephthalate (PET), 2027.4 g of diethylene glycol (DEG), and 2.4 g (0.06% by weight) of manganese acetate as the catalyst. The DEG added amounts to a 20% excess by weight, as determined by the PET's equivalent weight to transesterification. A nitrogen stream was provided through the resin kettle. The reaction mixture was heated with stirring at 200° C. until no solid PET polymer remained (reaction time was 3 hours), and then cooled to room temperature to produce a digested polyol mixture in the form of a viscous liquid (Polyol Mixture No. 1 of Table 1 below).

Each of Polyol Mixture Nos. 2-7 of Table 1 below were prepared in a similar manner employing scrap PET, DEG at the % weight excess shown in the table, and manganese acetate at the same level, i.e., 0.06% by weight. Reaction temperatures and times for the preparations and characteristics of the PET polyols produced are shown in Table 1.

TABLE 1

| Mixture No. | PET POLYOL MIXTURES | | | | | | |
|---|---|---|---|---|---|---|---|
| | 1 | 2 | 3 | 4 | 5 | 6 | 7 |
| % Excess DEG | 20 | 20 | 10 | 10 | 10 | 10 | 6 |
| Reaction Temp. (°C.) | 200 | 210 | — | 220 | 220 | 190 | 200 |
| Reaction Time (Hrs.) | 3 | 5 | — | 1.5 | 1 | 8.5 | 3.5 |
| Theoretical OH No. | 515.2 | 515.2 | 445 | 451.3 | 451.3 | 451.3 | 421.4 |
| Determined OH No. | 494.9 | 515.3 | — | 435.4 | 440.4 | 448.1 | 232.4 |
| Acid No. | — | — | — | 5.0 | 4.6 | 3.5 | 5.6 |
| % Free DEG | 22.3 | 22.1 | — | 13.1 | 14.4 | 12.7 | 12.0 |
| % Free EG[1] | 6.5 | 4.6 | — | 5.1 | 4.0 | 3.9 | 3.7 |
| % Water | — | — | — | — | — | — | 1.3 |
| Viscosity @ 25° C., cps | 1,056 | 950 | — | 5,050 | 6,250 | 12,500 | 16,000 |
| Components of PET Polyol Mixture (% by weight)[2] | | | | | | | |
| EØE[3] | 7.0 | 6.6 | 9.2 | 8.4 | 8.9 | 8.6 | — |
| EØD[4] | 24.0 | 23.5 | 22.3 | 22.8 | 23.5 | 23.2 | — |
| DØD[5] | 20.5 | 20.7 | 13.1 | 15.0 | 15.4 | 15.3 | — |
| Total 1-ring content[6] | 51.5 | 50.8 | 44.6 | 46.2 | 47.8 | 47.1 | — |
| Total 2-ring content | 27.6 | 27.7 | 27.8 | 27.6 | 27.2 | 27.0 | — |
| Total 3-ring content | 14.0 | 14.8 | 19.9 | 15.7 | 18.1 | 17.6 | — |
| Total 4-ring content | 4.7 | 4.9 | 7.8 | 10.6 | 7.0 | 6.9 | — |
| Other | 2.0 | 1.9 | — | — | — | 1.7 | — |

1. EG = Ethylene glycol
2. As determined by liquid chromatography using a C-18 column and a gradient methanol-H$_2$O liquid phase.
3. EØE = bis (hydroxyethyl) terephthalate.
4. EØD = hydroxyethyl$\beta$-($\beta^1$- hydroxy) diethylether terephthalate.
5. DØD = bis ($\beta$-($\beta^1$- hydroxy) diethylether) terephthalate.
6. Total amount of EØE, EØD and DØD.

EXAMPLE 2

This example illustrates the synthesis of polyisocyanurate foams utilizing digested Polyol Mixture No. 1 of Example 1. Comparative foams were also prepared using the same procedure and ingredients employed in synthesizing the inventive foams except that the digested polyol mixture of the invention was replaced with (a) an aromatic polyester polyol mixture supplied by Hercules Inc. under the trademark "Terate 202" in the case of Comparative Foams G-L of Table 2 below, and (b) diethylene glycol (DEG) in the case of Comparative Foams M-R of the same table.

A. SYNTHESIS OF POLYISOCYANURATE FOAMS

The components employed in synthesizing the foams, consisting of the ingredients in the parts by weight set forth in Table 2 below, were thoroughly mixed in the following manner. A first component (Component A of Table 2) was prepared by mixing together at 60°-65° F. the polymethylene polyphenylisocyanate, the blowing agent and the surfactant. A second component, the polyol (Component B of Table 2), also was maintained at 60°-65° F. A third component, the catalyst (Component C of Table 2), was formed by mixing at 70°-80° F. the tertiary amino phenol and the solution of potassium-2-ethyl hexoate. The first component and the second component were intimately mixed, whereupon the third component was mixed with the mixture of the first two. After mixing the three components, all ingredients were dispensed into a 12"×12"×6" box, yielding a polyisocyanurate foam. It was upon addition of the third component that timing started to determine the cream, firm and tack-free times reported in Table 2.

Various additional characteristics of the foams produced are shown in Table 2 below.

B. DETERMINATION OF % NCO IN ISOCYANURATE FOAMS

Each of the inventive foam and the two comparative foams having a theoretical % trimer of 20 (see Table 2 below) was tested to determine the weight percent isocyanate remaining unreacted in the foam (% NCO) in accordance with the following procedure:

PROCEDURE:
1. 0.2–0.5 gram of foam (in duplicate), grated with a #16 mesh Nichrome wire screen, was weighed into a 125 ml Erlenmeyer flask.
2. 5 ml of dry di-n-butylamine solution[a] was pipetted into the flask, wetting the entire sample but not the sides of the flask.
3. 5 ml of dry DMF (N,N-dimethylformamide) was pipetted into the flask. Any amine solution on the side of the flask was carefully washed down and the flask was stoppered with a cork immediately.
4. Steps 2 and 3 were repeated for a reagent blank.
5. The flasks were allowed to stand 30 minutes; then 50 ml of water was added from a graduated cylinder.
6. 5 drops of methyl red indicator were added and the excess amine was titrated with a standardized 0.1N HCl solution to the pink end point (yellow to pink).

CALCULATIONS:

$$\% \, NCO = \frac{(ml \, blank - ml \, sample)(normality \, HCl)(4.2)^b}{wt \, sample \, (gm)}$$

0.33[b]

where:
% NCO = percent isocyanate content in the foam
ml blank = the volume of HCl added to the blank
ml sample = the volume of HCl added to the sample
a. Di-n-butylamine solution made by pipetting 5 ml into a 100 ml volumetric flask and diluting to volume with dry DMF.

b. The factor 0.33 is the sample blank that has been treated with methanol, water and high temperature to minimize the residual isocyanate content. The 4.2 factor converts m-moles of NCO to grams NCO and includes the factor of 100 for converting weight ratio to percent.

The % NCO's determined are reported in Table 2.

TABLE 2
POLYISOCYANURATE FOAMS

I. PRODUCED FROM POLYOL MIXTURE NO. 1

| Foam | A | B | C | D | E | F |
|---|---|---|---|---|---|---|
| Ingredients (pts. by wt.) | | | | | | |
| Component A: | | | | | | |
| Polyisocyanate[1] | 263 | 254 | 245 | 236 | 227 | 218 |
| Monofluorotrichloromethane | 55.2 | 54.5 | 53.5 | 52.5 | 51.5 | 50 |
| L-5340[2] | 2.5 | 2.5 | 2.5 | 2.5 | 2.5 | 2.5 |
| Component B: | | | | | | |
| Polyol Mixture No. 1 | 37 | 46 | 55 | 64 | 73 | 82 |
| Component C: | | | | | | |
| Catalyst[3] | 11.2 | 12.0 | 14.1 | 15.2 | 16.1 | 17.1 |
| Reactivity | | | | | | |
| Cream Time (sec.) | 20 | 21 | 22 | 21 | 21 | 21 |
| Firm Time (sec.) | 60 | 57 | 47 | 42 | 40 | 37 |
| Tack Free Time (sec.) | 118 | 77 | 55 | 48 | 45 | 44 |
| % NCO | — | 0.8 | — | — | — | — |
| Density (pcf) | 1.67 | 1.66 | 1.60 | 1.50 | 1.47 | 1.45 |
| Compressive str. (psi) | | | | | | |
| Parallel to rise (at yield)[4] | 42.6 | 24.1 | 37.8 | 28.0 | 27.3 | 21.4 |
| Friability (% wt. loss)[5] | 24.7 | 14.5 | 7.4 | 5.1 | 4.7 | 3.1 |
| Oxygen Index[6] | 27.75 | 26.75 | 25.75 | 24.75 | 24.50 | 22.75 |
| % Closed Cells[7] | 89.42 | 87.91 | 87.82 | 86.58 | 85.65 | 84.20 |
| % Trimer (theoretical)[8] | 22 | 20 | 18 | 16 | 14 | 12 |
| Monsanto Tunnel (inches)[9] | 12 | 12 | — | 16 | — | — |
| OSU Rate of Release Data[10] | | | | | | |
| Max. rate of heat release (RHR) (in BTU/min.,ft.$^2$) | 160.8 | — | — | — | 197.6 | — |
| Cumulated heat release (CHR) (BTU/ft.$^2$) | | | | | | |
| over 1 min. | 117.0 | — | — | — | 144.7 | — |
| over 3 min. | 349.5 | — | — | — | 267.8 | — |
| over 5 min. | 506.6 | — | — | — | 398.2 | — |
| Max. rate of smoke release (SRR) (in particles/min.ft.$^2$) | 3357.9 | — | — | — | 3513.6 | — |
| Cumulated smoke release (CSR) (particles/ft.$^2$) | | | | | | |
| over 1 min. | 678.3 | — | — | — | 876.2 | — |
| over 3 min. | 1265.0 | — | — | — | 1078.8 | — |
| over 5 min. | 1496.0 | — | — | — | 1168.5 | — |

II. PRODUCED FROM TERATE 202 POLYOL

| Foam | G | H | I | J | K | L |
|---|---|---|---|---|---|---|
| Ingredients (pts. by wt.) | | | | | | |
| Component A: | | | | | | |
| Polyisocyanate[1] | 260 | 250 | 240.5 | 231 | 221.5 | 212 |
| Monofluorotrichloromethane | 55.2 | 54.5 | 53.5 | 52.5 | 51.5 | 50 |
| L-5340[2] | 2.5 | 2.5 | 2.5 | 2.5 | 2.5 | 2.5 |
| Component B: | | | | | | |
| Terate 202 Polyol | 40 | 50 | 59.5 | 69 | 78.5 | 88 |
| Component C: | | | | | | |
| Catalyst[3] | 10 | 13 | 14.5 | 15.5 | 15.0 | 15.5 |
| Reactivity | | | | | | |
| Cream Time (sec.) | 21 | 20 | 19 | 19 | 19 | 19 |
| Firm Time (sec.) | 58 | 44 | 41 | 35 | 34 | 33 |
| Tack Free Time (sec.) | 120 | 50 | 45 | 39 | 36 | 35 |
| % NCO | — | 4.1 | — | — | — | — |
| Density (pcf) | 1.85 | 1.83 | 1.74 | 1.80 | 1.77 | 1.77 |
| Compressive str. (psi) | | | | | | |
| Parallel to rise (at yield)[4] | 41.3 | 32.4 | 30.8 | 27.4 | 31.5[11] | 37.8 |
| Friability (% wt. loss)[5] | 20.8 | 18.0 | 13.5 | 11.4 | 6.1 | 8.7 |
| Oxygen Index[6] | 26.88 | 26.50 | 25.75 | 25.25 | 24.75 | 23.25 |
| % Closed Cells[7] | 89.12 | 88.26 | 86.77 | 88.54 | 86.73 | 87.80 |
| % Trimer (theoretical)[8] | 22 | 20 | 18 | 16 | 14 | 12 |
| Monsanto Tunnel (inches)[9] | 12 | — | — | 12 | — | — |
| OSU Rate of Release Data[10] | | | | | | |
| Max. rate of heat release (RHR) (in BTU/min.,ft.$^2$) | 180.9 | — | — | — | 237.8 | — |
| Cumulated heat release (CHR) (BTU/ft.$^2$) | | | | | | |
| over 1 min. | 137.9 | — | — | — | 167.0 | — |
| over 3 min. | 381.8 | — | — | — | 494.0 | — |
| over 5 min. | 555.9 | — | — | — | 696.5 | — |
| Max. rate of smoke release (SRR) | 3947.8 | — | — | — | 3890.6 | — |

TABLE 2-continued

POLYISOCYANURATE FOAMS

| (in paticles/min.ft.²) | | | | | | |
|---|---|---|---|---|---|---|
| over 1 min. | 937.9 | — | — | — | 1108.7 | — |
| over 3 min. | 1571.3 | — | — | — | 1853.9 | — |
| over 5 min. | 1776.4 | — | — | — | 2074.8 | — |

III. PRODUCED FROM DIETHYLENE GLYCOL

| Foam | M | N | O | P | Q | R |
|---|---|---|---|---|---|---|
| Ingredients (pts. by wt.) | | | | | | |
| Component A: | | | | | | |
| Polyisocyanate[1] | 277 | 271.5 | 266 | 260.5 | 255 | 249.5 |
| Monofluorotrichloromethane | 55.2 | 54.5 | 53.5 | 52.5 | 51.5 | 50 |
| L-5340[2] | 2.5 | 2.5 | 2.5 | 2.5 | 2.5 | 2.5 |
| Component B: | | | | | | |
| Diethylene Glycol | 23 | 28.5 | 34 | 39.5 | 45 | 50.5 |
| Component C: | | | | | | |
| Catalyst[3] | 9.6 | 9.8 | 10.7 | 11.0 | 14.6 | 15.5 |
| Reactivity | | | | | | |
| Cream Time (sec.) | 21 | 22 | 23 | 21 | 20 | 20 |
| Firm Time (sec.) | 38 | 37 | 36 | 32 | 25 | 25 |
| Tack Free Time (sec.) | 61 | 46 | 41 | 36 | 29 | 28 |
| % NCO | — | 1.4 | — | — | — | — |
| Density (pcf) | 1.74 | 1.67 | 1.61 | 1.65 | 1.64 | 1.61 |
| Compressive str. (psi) | | | | | | |
| Parallel to rise (at yield)[4] | 48.2 | 48.3 | 21.6[11] | 29.4 | 29.4 | 37.1 |
| Friability (% wt. loss)[5] | 44.6 | 37.6 | 36.2 | 19.6 | 20.5 | 14.2 |
| Oxygen Index[6] | 27.75 | 27.25 | 25.75 | 25.25 | 25.25 | 22.75 |
| % Closed Cells[7] | 87.68 | 87.75 | 86.65 | 87.92 | 85.55 | 89.17 |
| % Trimer (theoretical)[8] | 22 | 20 | 18 | 16 | 14 | 12 |
| Monsanto Tunnel (inches)[9] | 10 | — | — | 16 | — | — |
| OSU Rate of Release Data[10] | | | | | | |
| Max. rate of heat release (RHR) (in BTU/min.,ft.²) | 184.2 | — | — | — | 224.4 | — |
| Cumulated heat release (CHR) (BTU/ft.²) | | | | | | |
| over 1 min. | 135.6 | — | — | — | 171.6 | — |
| over 3 min. | 390.4 | — | — | — | 373.6 | — |
| over 5 min. | 551.2 | — | — | — | 564.3 | — |
| Max. rate of smoke release (SRR) (in particles/min.ft.²) | 2884.3 | — | — | — | 3368.3 | — |
| Cumulated smoke release (CSR) (particles/ft.²) | | | | | | |
| over 1 min. | 681.9 | — | — | — | 874.8 | — |
| over 3 min. | 1431.5 | — | — | — | 1097.8 | — |
| over 5 min. | 1639.1 | — | — | — | 1362.6 | — |

Footnotes to Table 2
[1]The polyisocyanate is a polymethylene polyphenyl isocyanate having an equivalent weight of 138, an acidity of 0.03% HCl, and a viscosity of 2000 centipoises at 25° C. and is available from the Mobay Chemical Company, Pittsburgh, Pa. under the trade name MONDUR MR-200.
[2]L-5340 is a silicone surfactant available from the Union CarbideCorporation.
[3]The catalyst is a mixture of 2,4,6-tris(dimethylaminomethyl) phenol, potassium-2-ethyl hexoate, and polyoxyethylene glycol in a 0.84:2.50:6:66 weight ratio. The tertiary amino phenol is that supplied by the Rohm & Haas Chemical Company under the trade name DMP-30. The potassium-2-ethyl hexoate is employed in the form of a 70 weight % solution in the polyoxyethylene glycol sold by the Union Carbide Corporation under the trade name Carbowax 200.
[4]According to ASTM Test Method D-1621-73.
[5]According to ASTM Test method C-421.
[6]Flammability test conducted acccording to ASTM D-2863-70, except that a sample measuring ¼" × ¼" × 6" was used.
[7]According to ASTM Test Method D-2856-70.
[8]% Trimer = $\frac{\text{(No. of equivalents of isocyanate − No. of equivalents of polyol)}}{\text{(Wt. of isocyanate + Wt. of polyol)}} \times 4200$
[9]According to ASTM Test Method E-84-75, 10 minutes duration.
[10]OSU Rate of Release Data refers to the measurements of the rate of heat and smoke release from a burning sample of material measuring 6 inches by 6 inches by 1 inch thick in a test chamber along with the cumulated heat and smoke release over standard periods of time. The measurements were carried out at Ohio State University in accordance with the method and apparatus described by E. E. Smith, Journal of Fire Technology (3), page 157, 1973. The measurements were performed at a heat flux of 5 watts/cm² and using the restraining holder.
[11]At 10% deformation.

The Table 2 results show that the inventive foams made from PET polyols are characterized by an outstanding combination of properties. These foams have a high compressive strength, low friability, excellent thermal stability and low flammability, low smoke evolution, and high conversion to trimer. As evidenced by the data set forth in Table 2 and illustrated graphically in FIG. 4, the inventive foams have a friability which is lower than the friabilities of the comparative foams made from the Terate 202 polyol and diethylene glycol. Further, the OSU rate of release data of Table 2 reveals that the inventive foams exhibit a lower smoke release than the comparative foams based on Terate 202. Also, comparison of the % NCO content of inventive Foam B, which had a theoretical % trimer of 20, with the % NCO content of the comparative foams having the same % trimer (Foams H and N) shows that the foam of the present invention is characterized by a % unreacted isocyanate which is lower than that of the comparative foams, i.e., the inventive foam displays a higher % conversion to trimer than the comparative foams.

Whereas the present invention has been described with respect to specific embodiments thereof, it should be understood that the invention is not limited thereto, as many modifications thereof may be made. It is, therefore, contemplated to cover by the present application any and all such modifications as fall within the true spirit and scope of the appended claims.

We claim:

1. A polyisocyanurate foam comprising the reaction product of an organic polyisocyanate, a blowing agent, a trimerization catalyst, and a minor amount of a polyol mixture prepared by digesting polyalkylene terephthalate with a polyol, wherein the equivalent ratio of said organic polyisocyanate to said polyol mixture is at least 1.5:1.

2. The polyisocyanurate foam of claim 1 wherein said organic polyisocyanate is a polymethylene polyphenylisocyanate.

3. The polyisocyanurate foam of claims 1 or 2 wherein said polyalkylene terephthalate has a molecular weight greater than 15,000 and is digested in a polyol selected from the group consisting of diethylene glycol, dipropylene glycol, polyethylene glycol and polypropylene glycol.

4. The polyisocyanurate foam of claim 1 wherein said digesting polyol is diethylene glycol.

5. The polyisocyanurate foam of claim 1 wherein said polyalkylene terephthalate is polyethylene terephthalate.

6. The polyisocyanurate foam of claim 1 wherein said organic polyisocyanate is a mixture of components of the formula

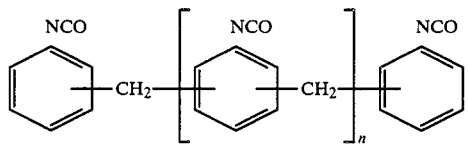

wherein n is an integer from 0 to 8 inclusive, and said mixture has:

(a) a functionality of 2.1 to 3.2,
(b) an equivalent weight between 120 and 180, and
(c) a viscosity at 25° C. between 150 and 2500 centipoises.

7. The polyisocyanurate foam of claim 1 wherein said digesting polyol is an aliphatic dihydric alcohol having 2 to 16 carbon atoms.

8. The polyisocyanurate foam of claims 1, 2 or 7 wherein said polyol mixture includes polyol added after the digestion reaction.

9. The polyisocyanurate foam of claims 1, 2 or 7 wherein said polyol mixture includes a diluent which is nonreactive to isocyanates.

10. The polyisocyanurate foam of claims 1, 2 or 7 wherein said polyol mixture contains about 5 to 40 percent by weight of said digesting polyol, based on the total weight of said polyol mixture.

11. The polyisocyanurate foam of claims 1, 2 or 7 wherein the equivalent ratio of said organic polyisocyanate to said polyol mixture is about 1.5:1 to 6:1.

12. The polyisocyanurate foam of claims 1 or 2 wherein the equivalent ratio of said organic polyisocyanate to said polyol mixture is about 1.5:1 to 6:1, and said digesting polyol is a member selected from the group consisting of diethylene glycol and polyoxyethylene glycols.

13. The polyisocyanurate foam of claims 1 or 2 wherein said digesting polyol is diethylene glycol and said polyol mixture is characterized by a viscosity in cps at 25° C. of about 700 to 8,000, a free diethylene glycol content of from about 10 to 30 percent by weight of said mixture, a hydroxyl number within a range of from about 400 to 550, and an acid number of about 0.2 to 10.

14. The polyisocyanurate foam of claim 1 wherein said organic polyisocyanate is a polymethylene polyphenylisocyanate, said polyalkylene terephthalate is polyethylene terephthalate, said digesting polyol is diethylene glycol, the equivalent ratio of said polymethylene polyphenylisocyanate to said polyol mixture is about 1.5:1 to 6:1, and said polyol mixture contains about 20 to 30 percent by weight of said diethylene glycol, based on the total weight of said polyol mixture.

15. The polyisocyanurate foam of claim 1 which comprises the reaction product of a polymethylene polyphenylisocyanate, a fluorocarbon blowing agent, a trimerization catalyst, and a polyol mixture prepared by the digestion, with diethylene glycol or polyoxyethylene glycols, of polyalkylene terephthalate, the equivalent ratio of said polymethylene polyphenylisocyanate to said polyol mixture being about 1.5:1 to 6:1.

16. The polyisocyanurate foam of claim 15 wherein said digesting polyol is diethylene glycol and said polyol mixture is characterized by a viscosity in cps at 25° C. of about 700 to 8,000, a free diethylene glycol content of from about 10 to 30 percent by weight of said mixture, a hydroxyl number within a range of from about 400 to 550, and an acid number of about 0.2 to 10.

17. The polyisocyanurate foam of claims 15 or 16 wherein said polyalkylene terephthalate is polyethylene terephthalate.

18. The polyisocyanurate foam of claim 17 wherein sasid trimerization catalyst comprises a mixture of a tertiary amino phenol and an alkali metal carboxylate.

19. The polyisocyanurate foam of claim 18 wherein said trimerization catalyst comprises a mixture of 2,4,6-tris(dimethylaminomethyl) phenol and potassium-2-ethyl hexoate in an equivalent ratio of about 0.4:1 to 2.5:1.

20. A process for producing a polyisocyanurate foam comprising reacting together under foam-forming conditions an organic polyisocyanate, a blowing agent, a trimerization catalyst, and a minor amount of a polyol mixture prepared by digesting polyalkylene terephthalate with a polyol, wherein the equivalent ratio of said organic polyisocyanate to said polyol mixture is at least 1.5:1.

21. A laminate comprising at least one facing sheet adhered to a polyisocyanurate foam which comprises the reaction product of an organic polyisocyanate, a blowing agent, a trimerization catalyst, and a minor amount of a polyol mixture prepared by digesting polyalkylene terephthalate with a polyol, wherein the equivalent ratio of said organic polyisocyanate to said polyol mixture is at least 1.5:1

22. The laminate of claim 21 wherein said polyisocyanurate foam is reinforced by glass fibers.

23. A process for producing a laminate comprising
(a) contacting a facing sheet with a polyisocyanurate foam-forming mixture comprising an organic polyisocyanate, a blowing agent, a trimerization catalyst, and a minor amount of a polyol mixture prepared by digesting polyalkylene terephthalate with a polyol, wherein the equivalent ratio of said organic polyisocyanate to said polyol mixture is at least 1.5:1, and (b) foaming said foam-forming mixture..

24. A polyisocyanurate foam formed by reacting an organic polyisocyanate and a minor amount of a polyol mixture in the presence of a blowing agent and, as a catalyst for said reaction, one or more catalysts known to catalyze the trimerization of isocyanates to form isocyanurates, and to catalyze the reaction of isocyanate groups with hydroxyl groups to form polyurethanes, wherein from about 1%-100% of the polyol mixture employed in said foam reaction consists of a digestion product obtained by digesting polyalkylene terephthalate in a digesting polyol selected from the class consisting of diols and triols haivng a molecular weight of from about 60-500.

25. The foam of claim 25 wherein the digesting polyol used to prepare the digestion product polyol is selected from the group consisting of diethylene glycol, dipropylene glycol and hydroxy-terminated polyesters.

26. The foam of claim 25 wherein the digesting polyol comprises at least in part dipropylene glycol.

27. The foam of claim 24 wherein the —NCO/—OH index of the reactants is between 1.5-6

28. The foam of claim 24 further including at least one surfactant.

29. The foam of claim 24 further including at least one flame retardant.

30. A method for making rigid polyisocyanurate foam which comprises combining:
a. an organic polyisocyanate;
b. a minor amount of a polyol mixture;
c. a blowing agent; and
d. a catalyst systen known to catalyze the trimerization of isocyanates to form isocyanurates, and to catalyze the reaction of isocyanate groups with hydroxyl groups to form polyurethanes, wherein from about 1% to 100% of said polyol mixture consists of the digestion product obtained by digesting polyalkylene terephthalate in a digesting polyol selected from the class consisting of diols and triols having a moleuclar weight of from about 60-500.

31. The method of claim 30 wherein the digesting polyol used to prepare the digestion product polyol is selected from the group consisting of diethylene glycol, dipropylene glycol and hydroxy-terminated polyesters.

32. The method of claim 31 wherein the digesting polyol comprises at least in part dipropylene glycol.

33. The method of claim 30 wherein the —NCO/—OH index of the reactants is between 1.5-6.

34. The method of claim 30 further including at least one surfactant.

35. The method of claim 30 further including at least one flame retardant.

* * * * *